(12) United States Patent
Koschier

(10) Patent No.: US 6,543,996 B2
(45) Date of Patent: Apr. 8, 2003

(54) HYBRID TURBINE NOZZLE

(75) Inventor: Angelo Von Koschier, Lynnfield, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/894,800

(22) Filed: Jun. 28, 2001

(65) Prior Publication Data
US 2003/0002979 A1 Jan. 2, 2003

(51) Int. Cl.[7] .............................. F01W 9/04; F01W 9/06
(52) U.S. Cl. ................. 415/200; 415/208.2; 416/241 B
(58) Field of Search .................. 415/191, 200, 415/208.2, 134, 139, 115, 209.4, 211.2; 416/241 B

(56) References Cited

U.S. PATENT DOCUMENTS

| | | | | |
|---|---|---|---|---|
| 4,861,229 A | * | 8/1989 | Halstead | ...................... 415/138 |
| 5,706,647 A | | 1/1998 | Frey et al. | |
| 5,813,832 A | * | 9/1998 | Rasch et al. | ................. 415/200 |
| 6,200,092 B1 | | 3/2001 | Koschier | |

* cited by examiner

Primary Examiner—Edward K. Look
Assistant Examiner—Igor Kershteyn
(74) Attorney, Agent, or Firm—Rodney M. Young; Francis L. Conte

(57) ABSTRACT

A turbine nozzle includes ceramic outer and inner bands and an integral ceramic vane aft segment. A metal vane forward segment adjoins the aft segment in a hybrid assembly.

20 Claims, 2 Drawing Sheets

HYBRID TURBINE NOZZLE

The US Government may have certain rights in this invention in accordance with Contract No. N00421-97-C-1464 awarded by the Department of the Navy.

BACKGROUND OF THE INVENTION

The present invention relates generally to gas turbine engines, and, more specifically, to turbine nozzles therein.

In a gas turbine engine, air is pressurized in a compressor, mixed with fuel in a combustor, and ignited for generating hot combustion gases which flow downstream into a turbine which extracts energy therefrom. The turbine includes a turbine nozzle having a plurality of circumferentially spaced apart nozzle vanes supported by integral outer and inner bands. A high pressure turbine nozzle first receives the hottest combustion gases from the combustor and channels those gases to a turbine rotor having a plurality of circumferentially spaced apart rotor blades extending radially outwardly from a supporting disk.

Overall engine efficiency is directly related to the temperature of the combustion gases which must be limited to protect the various turbine components which are heated by the gases. The high pressure turbine nozzle must withstand the high temperature combustion gases from the combustor for a suitable useful life. This is typically achieved by using superalloy materials which maintain strength at high temperature, and diverting a portion of compressor air for use as a coolant in the turbine nozzle.

Superalloy strength is limited, and diverted compressor air reduces the overall efficiency of the engine. Accordingly, engine efficiency is limited in practice by the availability of suitable superalloys, and the need to divert compressor air for cooling turbine nozzles.

Ceramic materials are being considered for the advancement of turbine nozzles to further increase the temperature capability thereof and reduce the use of diverted cooling air therefor. However, conventional ceramic materials available for this purpose have little ductility and require special mounting configurations for preventing fracture damage thereof limiting their useful life.

Turbine nozzle design is further complicated since the nozzle is an annular assembly of vanes which are subject to three dimensional aerodynamic loading and temperature gradients therethrough. Turbine nozzles expand and contract during operation, with attendant thermally induced stress therefrom.

Accordingly, it is desired to provide an improved turbine nozzle formed of ceramic for withstanding the hostile environment of a gas turbine engine.

BRIEF SUMMARY OF THE INVENTION

A turbine nozzle includes ceramic outer and inner bands and an integral ceramic vane aft segment. A metal vane forward segment adjoins the aft segment in a hybrid assembly.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
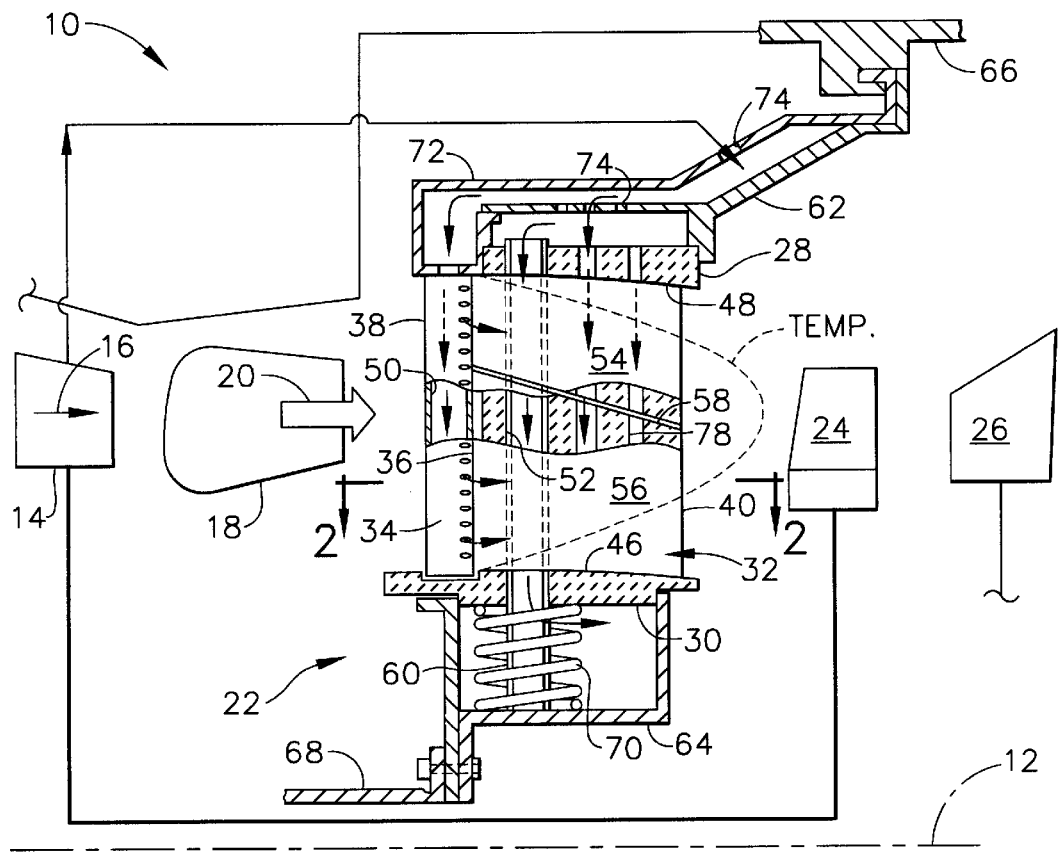
FIG. 1 is a schematic axial sectional view through a core engine of a gas turbine engine including a hybrid metal-ceramic turbine nozzle in accordance with an exemplary embodiment of the present invention.

Illustrated in FIG. 1 is a schematic representation of a portion of a gas turbine engine 10 which is axisymmetrical about a longitudinal or axial centerline axis 12. The core engine is illustrated and includes a conventional multistage compressor 14 which pressurizes air 16 that is discharged to an annular combustor 18 in which fuel is injected and ignited for generating hot combustion gases 20.

Disposed at the outlet of the combustor is an annular first stage hybrid turbine nozzle 22 in accordance with an exemplary embodiment of the present invention which directs the combustion gases to a following high pressure turbine 24. The turbine 24 includes a row of rotor blades supported by a rotor disk which in turn is joined to the compressor by a rotor shaft extending therebetween.

The turbine extracts energy from the combustion gases to power the compressor during operation. And, a low pressure turbine 26 is disposed downstream from the high pressure turbine for extracting additional energy from the combustion gases for producing useful work, such as powering a fan (not shown) in a turbofan aircraft gas turbine engine application.

As indicated above, overall engine efficiency may be maximized by increasing the operating temperature of the combustion gases. However, cooling air must be bled from the compressor which correspondingly decreases overall engine efficiency. The hybrid turbine nozzle illustrated in FIG. 1 provides a new assembly of components specifically configured for reducing the need for bleeding cooling air from the compressor, and therefore further increases overall efficiency of the engine.

The turbine nozzle initially illustrated in FIG. 1 includes a radially outer ceramic outer band 28, and a radially inner ceramic inner band 30 disposed coaxially around the centerline axis 12. A ceramic vane aft segment 32 is integrally joined at opposite radial or span ends to the outer and inner bands. And a metal vane forward segment 34 adjoins the aft segment along a radial splitline 36 extending radially in span between the two bands.

Figure 2:
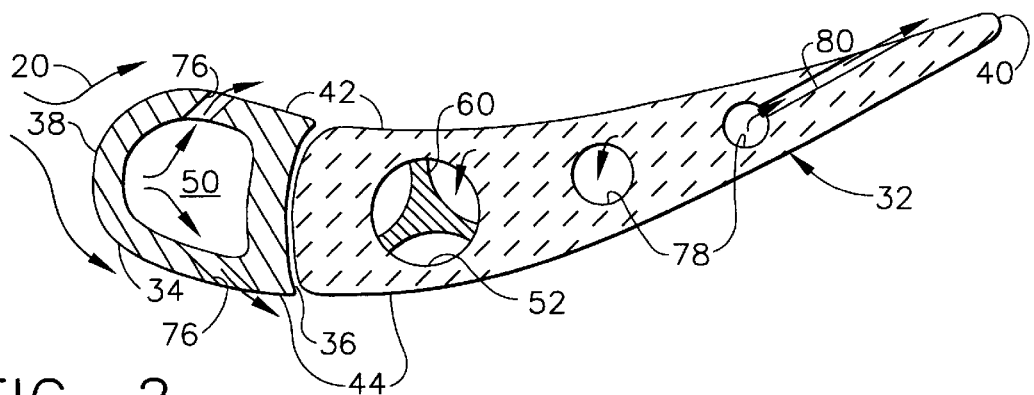
FIG. 2 is a radial sectional view through the hybrid vane illustrated in FIG. 1 and taken along line 2—2.

An exemplary one of the hybrid vanes is illustrated in radial section in FIG. 2 in which the aft and forward segments 32,34 collectively define the overall aerodynamic profile of the vane airfoil as required for channeling the combustion gases to the high pressure turbine in accordance with conventional practice. However, instead of providing a unitary vane formed of typical superalloy metal, the nozzle vanes illustrated in FIGS. 1 and 2 are hybrid constructions of ceramic aft segments and metal forward segments.

Conventional ceramics may be used such as monolithic silicon nitride ($Si_3N_4$), which is a toughened ceramic commercially available from Honeywell Specialty Materials of Los Angeles, Calif. under the tradename AS800 or similar material. And, any conventional high-temperature capable metal such as nickel-based superalloys typically used in turbine vanes may be used for the forward segments 34.

In this way, the high-temperature capability of monolithic ceramic may be used for a majority of each vane, with the forward segment thereof being formed of conventional superalloy metal for its enhanced strength and durability in the hostile environment of a gas turbine engine.

As indicated above, ceramics are highly heat resistant but have little ductility and are subject to erosion or damage during operation at a greater rate than that of superalloy metal. Correspondingly, superalloy metal is limited in high-temperature capability, yet is quite durable and can readily withstand erosion due to particulate matter, such as carbon, found in the combustion gases discharged from the combustor.

As shown in FIG. 2, the forward segment 34 includes the vane leading edge 38 around which the combustion gases 20 split during operation. The aft segment includes the trailing edge 40 aft of which the combustion gases rejoin or flow to the turbine. The aft and forward segments collectively define the aerodynamic profile of the vane airfoil including the generally concave pressure side 42, and the generally convex suction side 44 which extend chordally or axially between the leading and trailing edges of the vane on opposite sides thereof.

As shown in FIG. 1, the two segments extend in radial span from a root 46 at the junction with the inner band 30 to a tip 48 at the junction with the outer band.

Figure 3:
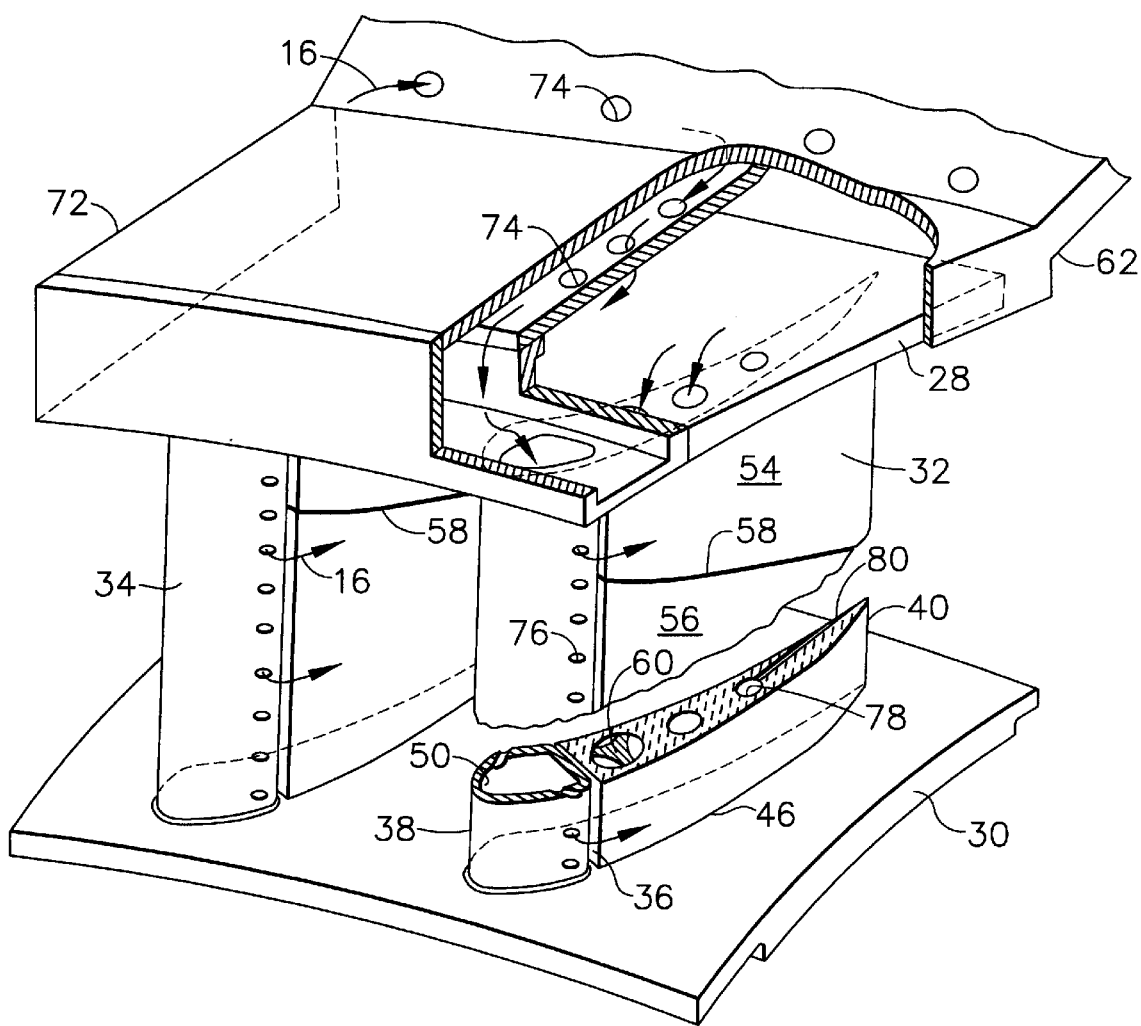
FIG. 3 is an isometric view, partly in section, of an exemplary segment of the turbine nozzle illustrated in FIG. 1.

As shown in FIG. 3, the bands 28,30 are preferably formed in arcuate segments which collectively define the full 360 degree extent of the turbine nozzle. And, each vane segment preferably includes a pair of the hybrid vanes extending radially between the bands. The vane segments circumferentially abut each other in the nozzle and may be suitably sealed in any conventional manner.

As shown in FIG. 2, the forward segment 34 is hollow along its span and includes a leading edge flow channel 50 through which a portion of the compressed air 16 bled from the compressor is channeled for cooling the forward segment. And, the aft segment 32 includes a cylindrical passage or bore 52 extending in span between the outer and inner bands. Additional cooling air may be channeled through the bore 52 for cooling the aft segment during operation.

A particular advantage of the hybrid vane construction is that the ceramic aft segment requires relatively little cooling during operation, and therefore relatively little air must be bled from the compressor for cooling thereof. Since the metal forward segment 34 is limited in configuration and size for the leading edge portion of the vane itself, the amount of cooling air bled from the compressor for the forward segment is also limited. In this way, less cooling air is required for cooling each hybrid vane as compared to a full metal vane. The reduced cooling air requirement for the hybrid vane permits a corresponding increase in overall engine efficiency not otherwise possible.

FIG. 1 illustrates schematically an exemplary radial temperature profile for the combustion gases channeled through the turbine nozzle. The temperature profile is generally parabolic with maximum gas temperature near the middle thereof and decreasing in temperature to the outer and inner bands.

Accordingly, each vane is subject to a large gradient in temperature of the combustion gases, which in turn subjects the hybrid vanes to thermally induced stress.

Thermal stress in the ceramic aft segment may be substantially reduced by radially bifurcating each aft segment into a radially outer section 54 integrally joined to the outer band 28 as illustrated in FIGS. 1 and 3, and a radially inner section 56 integrally joined to the inner band 30. The two sections are separated from each other by an axially or chordally extending splitline 58. The axial splitline interrupts the radial continuity of the ceramic aft segment to prevent buildup of large thermally induced stress due to the large gradient of the combustion gases.

As shown in FIG. 3, a pair of the ceramic outer sections 54 are integrally joined to the ceramic outer band 28 in a unitary or one-piece assembly which may be conventionally manufactured using a common casting mold therefor. Similarly, a pair of the ceramic inner sections 56 are integrally joined to the inner band 30 in another unitary or one-piece construction made using another common casting mold therefor.

When assembled, the outer and inner sections are radially aligned with each other, and a single or unitary metal forward segment 34 is disposed in the front of each vane segment to extend the full radial span of the collective vane assembly radially bridging the axial splitline 58, with the radial splitline 36 being disposed axially between the forward and aft segments.

In view of the two-part aft vane segments 32, a support rod 60, of either ceramic or nickel-based superalloy material, extends through the central bore 52 of the aft segments, as well as through corresponding apertures in the outer and inner bands. The support rod maintains radial alignment of the two sections 54,56, and both axial and circumferential alignment of the supporting two bands.

An annular outer support frame 62 is configured for trapping the row of outer bands therein, and an annular inner frame 64 is configured for trapping the row of inner bands therein.

The two frames 62,64 may be formed of any suitable metal and preferably extend in 360 degree rings of one or more metal components to define generally U-shaped channels in which the respective bands are retained and trapped axially. As shown in FIG. 1, the outer frame 62 is supported in a portion of an annular outer casing 66 of the engine for in turn supporting the nozzle assembly 22. The inner frame 64 supports the segments of the inner band 30 in a full ring, and includes an annular seal carrier 68 for providing a rotary seal with the turbine rotor shaft (not shown).

Since the inner band and vane segments are uncoupled from the outer band and vane segments at the axial splitline, the support rods 60 structurally couple together the outer and inner vane sections and carry the aerodynamic torque loads of the vane sections to the casing. In an alternate embodiment, the nozzle may instead be supported from the inner band, with the outer band being suitably sealed to the outer casing.

As shown in FIG. 1, the support rod 60 preferably extends downwardly into the inner frame 64 wherein it is surrounded by a compression spring 70 trapped inside the inner frame. A corresponding spring surrounds the lower end of each of the support rods and is compressed during assembly for providing a radially outward compression force for pressing together the radially bifurcated outer and inner vane sections 54,56. In this way, the axial splitline 58 is maintained closed by the spring compression force for maintaining structural continuity of the vane segments. And, the axial splitline is additionally closed by the reduction in static pressure of the combustion gases flowing through the nozzle.

As shown in FIG. 1, the corresponding junctions of the bands and frames include stepped corners for trapping and retaining axially the two bands in the assembled turbine nozzle assembly. The steps in the inner band permit slight radially outward movement of the inner band as the compression springs press the inner sections against the outer sections of the vane pairs.

In the preferred embodiment illustrated in FIGS. 1 and 3, an annular outer manifold 72 is fixedly joined to the vane forward segments 34 for supporting those segments in front of the corresponding vane aft segments 32. The manifold may be formed of any suitable metal in one or more assembled rings from which the several vane forward segments 34 are fixedly attached, by brazing for example, for their retention and support during operation.

Preferably the vane forward segments 34 are cantilevered from the outer manifold and terminate at the outer surface of the inner band. As shown in FIGS. 1 and 3, each of the forward segments may terminate in a shallow pocket formed in the outer surface of the inner band, or that outer surface may be smooth without pockets if desired.

Suitable means are provided, including a bleed circuit from the compressor 14 to the outer manifold 72, for channeling cooling air 16 through the outer manifold and outer frame for cooling the nozzle segments. Suitable apertures 74 are formed through the walls of the outer manifold and outer frame for correspondingly channeling portions of the cooling air inside the forward and aft vane segments for internal cooling thereof.

As shown in FIGS. 1 and 3, each vane forward segment 34 is attached to the common outer manifold 72 and has a top inlet through which the cooling air is channeled radially inwardly behind the leading edge of the vane. The forward segment may be closed at its radially inner end, and preferably includes rows of film cooling holes 76 from which the cooling air is discharged from the leading edge portion of the vanes and flows downstream over both pressure and suction sides for external film cooling thereof in a conventional manner.

As shown in FIG. 2, the support rod 60 preferably includes external surface grooves extending along the length thereof for channeling a portion of the cooling air from inside the outer frame 62 radially inwardly through the vane bores 52 for internal cooling thereof. The cooling air may be suitably discharged through the inner frame 64, and some of the cooling air may leak through the axial splitline 58 during operation.

As shown in FIGS. 1 and 2, the vane aft segment 32 may also include one or more additional internal flow channels 78 extending in span therethrough, and disposed in flow communication with the inside of the outer frame for receiving the cooling air therefrom. And, a row of discharge holes 80 is preferably disposed along the pressure side of the vane near the trailing edge for discharging the cooling air from the corresponding internal flow channel 78.

The radial and axial splitlines 36,58 divide each nozzle vane into three parts which collectively define the aerodynamic profile of the vane airfoil yet permit the preferential use of limited metal in the forward segment and monolithic ceramic in the aft segment for reducing cooling air requirements while increasing durability of the hybrid vanes for a suitable useful life in the hostile environment of the turbine nozzle.

The axial splitline 58 as shown in FIG. 1 is positioned in span between the two bands near the radial center region of the vanes to substantially reduce the buildup of thermally induced stress due to temperature gradients in the combustion gases. Since the maximum temperature region of the combustion gases is near the midspan of the vanes, the axial splitline is located in this region which may be an exemplary range of about 30 percent B 70 percent of the radial span as measured from the inner band.

In the preferred embodiment illustrated in FIG. 1, the axial splitline 58 is inclined radially inwardly in the direction of gas travel toward the vane trailing edge to correspond generally with the inclination of the gas streamlines or isoclines of the corresponding high temperatures of the combustion gases. The axial splitline may be located in radial span, and either cylindrical without inclination or conical with inclination relative to the centerline axis of the engine for reducing thermal stress generated during operation.

Accordingly, the metal-ceramic hybrid turbine nozzle disclosed above permits a substantial reduction in the cooling air requirements therefor for increasing overall efficiency of the engine, while effecting a turbine nozzle with suitable durability for extended life in a hostile gas turbine engine.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured Letters Patent of the United States is the invention as defined and differentiated in the following claims in which I claim:

1. A turbine nozzle comprising:
   ceramic outer and inner bands;
   a ceramic vane aft segment integrally joined at opposite ends to said bands; and
   a metal vane forward segment adjoining said aft segment and extending in span between said bands.

2. A nozzle according to claim 1 wherein:
   said forward segment is hollow; and
   said aft segment includes a bore extending between said bands.

3. A nozzle according to claim 2 further comprising a rod extending through said bore and bands.

4. A nozzle according to claim 3 wherein said aft segment is bifurcated in an outer section integrally joined to said outer band, and an inner section integrally joined to said inner band.

5. A nozzle according to claim 4 further comprising:
   an outer frame trapping said outer band therein; and
   an inner frame trapping said inner band therein.

6. A nozzle according to claim 5 further comprising an outer manifold fixedly joined to said forward segment for supporting said forward segment in front of said aft segment.

7. A nozzle according to claim 6 further comprising means for channeling cooling air through said outer manifold and outer frame, and inside said aft and forward vane segments for cooling thereof.

8. A nozzle according to claim 7 wherein said rod includes external surface grooves along the length thereof for channeling said cooling air through said bore.

9. A nozzle according to claim 7 further comprising a flow channel extending in span through said aft segment and disposed in flow communication with a row of discharge holes disposed along a trailing edge of said aft segment for discharging said cooling air.

10. A nozzle according to claim 6 further comprising a spring disposed inside said inner frame around said rod for pressing together said outer and inner vane sections.

11. A nozzle according to claim 10 wherein said outer and inner sections abut each other at an inclined splitline.

12. A nozzle according to claim 11 wherein said splitline is positioned between said bands to correspond with a maximum temperature region of said combustion gases flowing through said nozzle.

13. A nozzle according to claim 6 wherein said forward segment is cantilevered from said outer manifold and terminates at said inner band.

14. A turbine nozzle comprising:

ceramic outer and inner bands;

a pair of ceramic outer sections integrally joined to said outer band;

a pair of ceramic inner sections integrally joined to said inner band in alignment with said outer sections to define a pair of vane aft segments bifurcated at an axial splitline; and a pair of metal vane forward segments adjoining respective ones of said vane aft segments along a radial splitline.

15. A nozzle according to claim 14 further comprising:

an outer frame trapping said outer band therein; and an inner frame trapping said inner band therein.

16. A nozzle according to claim 15 further comprising an outer manifold fixedly joined to said forward segments for supporting said forward segments in front of said aft segments.

17. A nozzle according to claim 16 wherein:

each of said aft segments includes a bore extending between said bands;

a rod extends through said bore and bands; and a compression spring is disposed inside said inner frame around said rod for pressing together said aft outer and inner sections.

18. A nozzle according to claim 17 wherein each of said forward segments is cantilevered from said outer manifold and terminates at said inner band.

19. A nozzle according to claim 18 wherein:

each of said forward segments is hollow;

said rod includes external surface grooves along the length thereof; and means are provided for channeling cooling air through said outer manifold and outer frame and inside said hollow forward segments and inside said bores of said aft segments for cooling thereof.

20. A nozzle according to claim 19 wherein said axial splitline is positioned between said bands and is inclined to correspond to streamlines within a maximum temperature region of combustion gases flowing through said nozzle.

\* \* \* \* \*

UNITED STATES PATENT AND TRADEMARK OFFICE
CERTIFICATE OF CORRECTION

PATENT NO.    : 6,543,996 B2
DATED         : April 8, 2003
INVENTOR(S)   : Koschier It is certified that error appears in the above-identified patent and that said Letters Patent is hereby corrected as shown below:

Column 5,
Line 64, delete "30 percent B 70 percent" and substitute -- 30 percent - 70 percent --.

Signed and Sealed this

Eighth Day of July, 2003

JAMES E. ROGAN
*Director of the United States Patent and Trademark Office*